United States Patent [19]

O'Grady

[11] Patent Number: 5,595,102
[45] Date of Patent: Jan. 21, 1997

[54] APPARATUS FOR CLAMPING STACKED ITEMS FOR CUTTING

[76] Inventor: Paul J. O'Grady, 1010 6th St., Pentwater, Mich. 49449

[21] Appl. No.: 369,393

[22] Filed: Jan. 6, 1995

[51] Int. Cl.⁶ .................................................. B23Q 3/06
[52] U.S. Cl. ..................... 83/435.17; 83/452; 83/477.2; 83/437.3
[58] Field of Search ................... 83/437, 425, 435.1, 83/422, 460, 461, 452, 409, 409.1; 269/99, 155, 114, 203, 25, 20; 144/286 R

[56] References Cited

U.S. PATENT DOCUMENTS

| | | | |
|---|---|---|---|
| 3,620,270 | 11/1971 | Jureit | 83/461 X |
| 3,693,489 | 9/1972 | Pearl | 83/374 |
| 3,851,557 | 12/1974 | Vierstraete | 83/453 |
| 3,872,760 | 3/1975 | Desnoyers, Jr. | 83/743 |
| 4,018,118 | 4/1977 | Goff | 83/460 X |
| 4,046,041 | 9/1977 | Stolzer | 83/210 |
| 4,080,858 | 3/1978 | Stolzer | 83/247 |
| 4,281,570 | 8/1981 | Hill | 83/477.2 |
| 4,283,977 | 8/1981 | Batson | 83/453 |
| 4,305,318 | 12/1981 | Stolzer | 83/452 X |
| 4,516,612 | 5/1985 | Wiley | 144/286 R X |
| 4,576,213 | 3/1986 | Miller | 269/25 X |
| 4,628,782 | 12/1986 | Park | 83/442 |
| 4,658,686 | 4/1987 | Woods | 83/425 |
| 4,669,348 | 6/1987 | Holder | 83/452 X |
| 4,952,269 | 8/1990 | Mortoly et al. | 269/25 X |
| 5,038,646 | 8/1991 | Suwitoadji | 83/442 X |
| 5,058,474 | 10/1991 | Herrera | 83/447 |
| 5,103,704 | 4/1992 | Spath et al. | 83/452 |
| 5,186,228 | 2/1993 | Stafford | 144/286 R |
| 5,191,821 | 3/1993 | Metzger, Jr. et al. | 83/437 X |
| 5,228,374 | 7/1993 | Santeramo, Sr. | 83/438 |
| 5,239,905 | 8/1993 | Dunn | 83/459 |
| 5,240,051 | 8/1993 | Quick et al. | 269/25 X |

Primary Examiner—Rinaldi I. Rada
Assistant Examiner—Elizabeth Stanley
Attorney, Agent, or Firm—Richard C. Litman

[57] ABSTRACT

An apparatus for cutting stacked items on a table saw, or the like, is made up of horizontal and vertical clamps. The horizontal clamps hold the stacked items against an aligning fence and the vertical clamps hold the stacked items against the sliding table. The entire device is held in place on a sliding table of a table saw by guide shoes slidably fitting into a slot in the sliding table of the table saw. A pneumatic manifold and switch control the delivery of an external air supply to the pneumatic clamps and guide shoes.

13 Claims, 2 Drawing Sheets

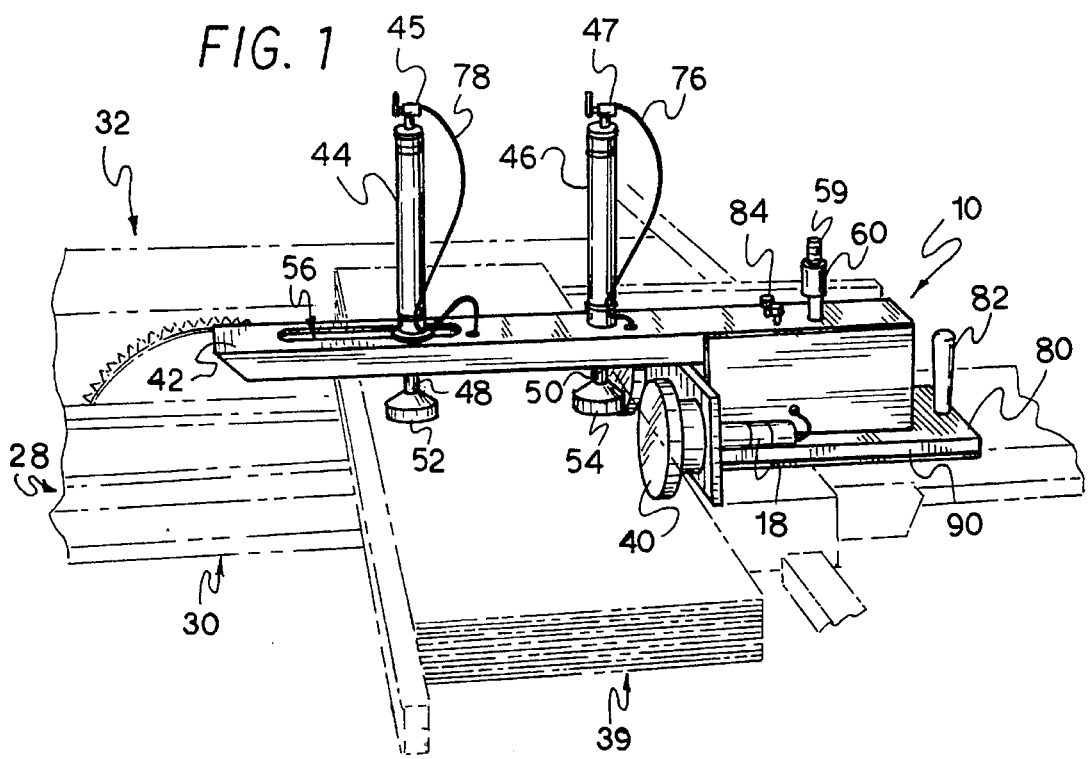
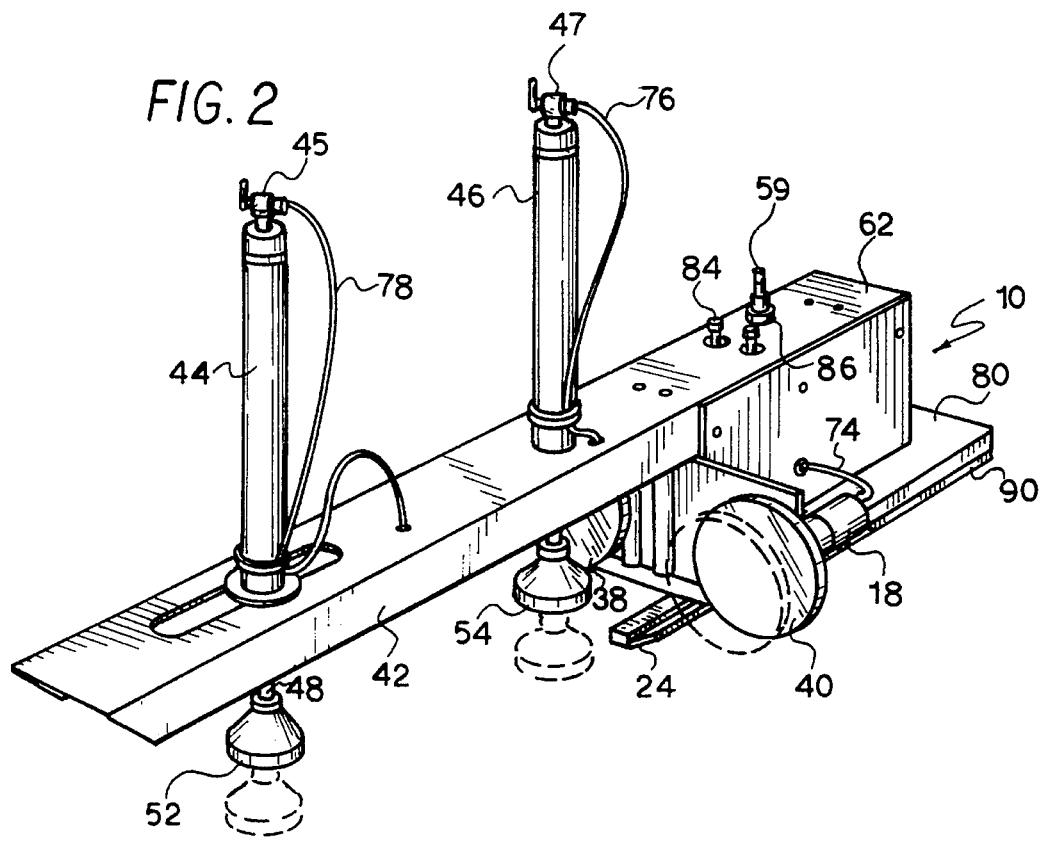

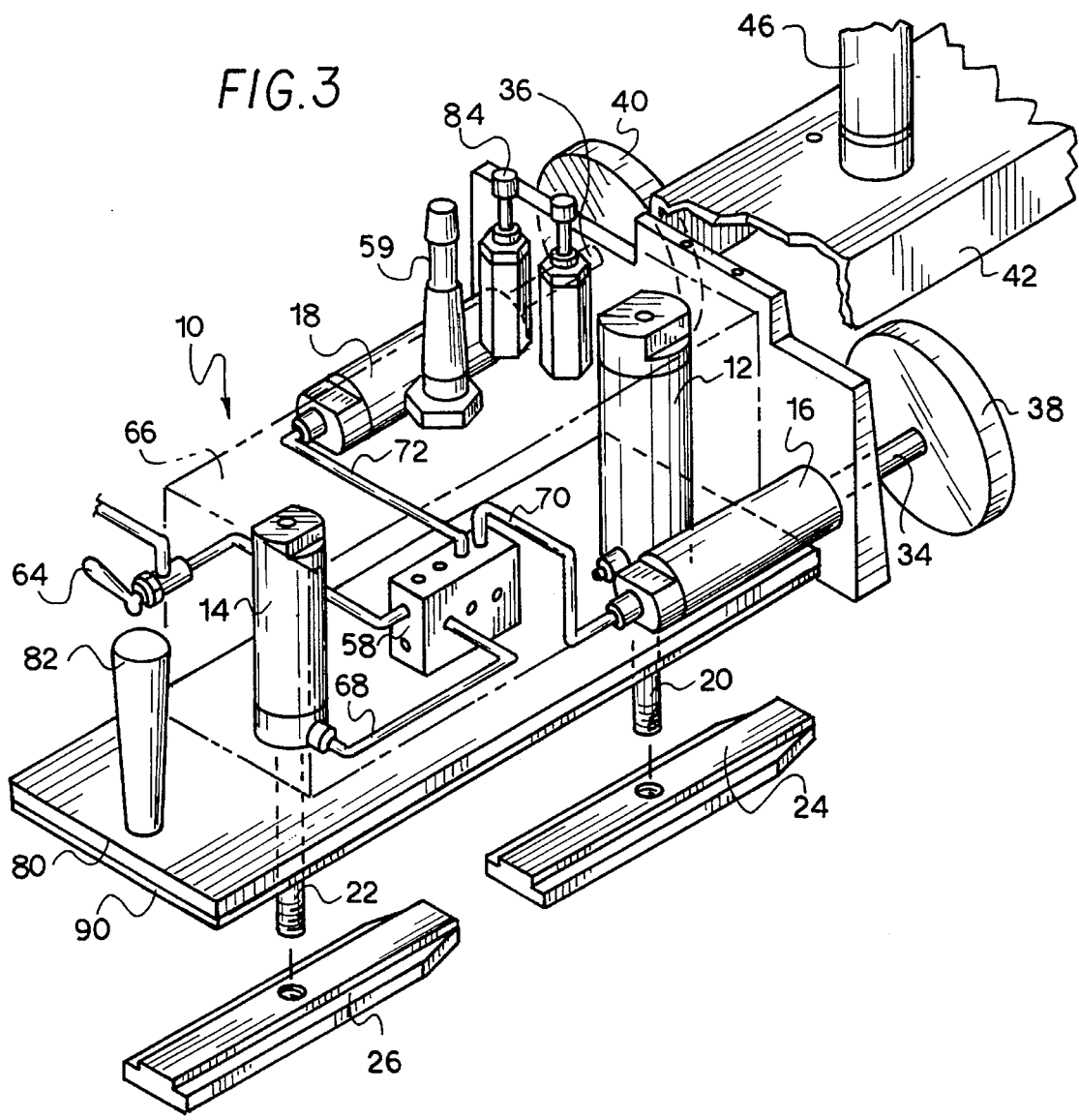

APPARATUS FOR CLAMPING STACKED ITEMS FOR CUTTING

BACKGROUND OF THE INVENTION

1. Field of the Invention

The present invention relates generally to an apparatus for holding items to be cut, and deals more particularly with an improved apparatus capable of securely holding stacked materials for accurate, safe cross-cutting on a sliding table saw.

2. Description of the Invention

In the field of cutting material with table saws, there is typically a need to securely hold the material to be cut in a particular position to ensure the desired results. Also, it is important to avoid the need for the user to place a hand near the spinning saw blade. Current practice includes providing clamps that exert pressure against the work-piece so that it is forced either horizontally against a fence on the saw, or vertically against a table on the saw. Such clamps are typically integral with the saw, provide force in only one direction at a time, are difficult to attach and operate, and/or are not adapted for use with commonly used table saws. Also, such clamps are usually not designed for use with stacked materials. If the clamps do not allow use with stacked materials, multiple passes with the saw blade are required to bring about the same result as a single pass through the stacked materials. Consequently, stacking materials to be cut results in time savings and increased accuracy.

Several attempts have been made to provide improved means for holding materials to be cut by a saw. Several such attempts provide only horizontal pressure. U.S. Pat. No. 5,239,905, issued to Gail E. Dunn on Aug. 31, 1993, demonstrates a manual clamping mechanism for holding molding against the fence of a miter table, but does not provide means for creating vertical pressure necessary for holding stacked items. U.S. Pat. No. 5,103,704, issued to Dieter Spath, et al., on Apr. 14, 1992, shows a device that provides manual horizontal clamping pressure, but does not provide the vertical clamping pressure necessary for holding stacked items in place. U.S. Pat. No. 4,305,318, issued to Paul Stolzer on Dec. 15, 1981, provides a saw with hydraulically actuated clamping means for providing only horizontal clamping pressure to two sides of a work-piece. U.S. Pat. No. 4,080,858, issued to Paul Stolzer on Mar. 28, 1978, discloses a clamping arrangement that provides only manual horizontal pressure. U.S. Pat. No. 4,046,041, issued to Paul Stolzer on Sep. 6, 1977, shows a clamping-feeding mechanism in which a pair of clamping jaws operate under hydraulic pressure and are not adaptable to use with a sliding table saw.

U.S. Pat. No. 5,058,474, issued to Gerardo Herrera on Oct. 22, 1991, describes a fence attachment for providing adjustable placement of manual, vertical clamping pressure. U.S. Pat. No. 4,669,348, issued to Kurt Holder on Jun. 2, 1987, shows a saw with manual vertical clamping means, but the clamping means cannot simultaneously provide horizontal clamping pressure. U.S. Pat. No. 4,658,686, issued to Gary W. Woods on Apr. 21, 1987, shows a clamping device that is slidably inserted into a slot, but the device provides only manual, vertical clamping pressure.

U.S. Pat. No. 4,283,977, issued to William A. Batson on Aug. 18, 1981, discloses a manual clamping means for forcing a work-piece against a fence or support base, but not against both simultaneously.

U.S. Pat. No. 4,628,782, issued to Robert A. Park on Dec. 16, 1986, shows a guide-clamp device that is designed to create true cuts, but it is intended for use only with one item at a time and does not provide means for clamping the work-piece against the fence of a sliding table of a table saw. U.S. Pat. No. 3,872,760, issued to George J. Desnoyers, Jr., on Mar. 25, 1975, shows a clamping means for replicating the sawn dimensions of multiple items, but requires that the items be separately sawn, resulting in a multiplication of time required to complete the sawing, as compared to a device that allows sawing of stacked items. Also, it uses manual, rather than pneumatic clamping force. U.S. Pat. No. 3,851,557, issued Jean Vierstraete on Dec. 3, 1974, includes means for properly aligning a single item to be cut, but it does not have adjustable means for forcing a stack of items against the fence of a table saw. Also, it uses hydraulic, rather than pneumatic clamping force.

U.S. Pat. No. 3,693,489, issued to David R. Pearl on Sep. 26, 1972, discloses means to avoid movement of the clamp relative to the stacked materials, which movement can also result in misalignment of the stacked items. The Pearl invention includes a cutting means, and is not for use with independent cutting means.

None of the above inventions and patents, taken either singly or in combination, is seen to describe the instant invention as claimed.

SUMMARY OF THE INVENTION

By the present invention an improved apparatus for holding stacked items for cutting is provided which overcomes the above-noted shortcomings and offers a safe, convenient, efficient and effective manner of cutting consistently square cross-cuts on a sliding table saw. The apparatus includes horizontal and vertical clamps. The horizontal clamps hold the stacked items against an aligning fence and the vertical clamps hold the stacked items against the sliding table. The entire device is held in place on a sliding table of a table saw by guides slidably fitting into a slot in the sliding table of the table saw.

Accordingly, it is a principal object of the invention to provide a safe, accurate, easy-to-use method for simultaneously cross-cutting multiple work-pieces to the same, square dimension.

It is another object of the invention to provide a clamping device for use with a sliding table saw.

It is a further object of the invention to provide quick, easy-to-access, uncomplicated clamping pressure through use of readily available pneumatic force rather than manual or hydraulic force.

Still another object of the invention is to allow convenient adjustments of the clamping surfaces relative to the work-pieces.

It is yet another object of the invention provide a simple mechanism for mounting a clamping device for use.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1 is an environmental, perspective view of a table saw and stack of boards to be cut therewith, on which this invention is mounted.

FIG. 2 is a perspective view of the invention.

FIG. 3 is a partial cutaway, partly exploded view showing internal components of this invention.

Similar reference characters denote corresponding features consistently throughout the attached drawings.

DETAILED DESCRIPTION OF THE PREFERRED EMBODIMENT

Referring to FIGS. 1–3, the apparatus for holding stacked items to be cut, according to the present invention, includes a base unit 10 containing four pneumatic cylinders 12, 14, 16, 18. As best shown in FIG. 3, pneumatic cylinders 12, 14 in the base unit 10 have pistons 20, 22 connected to two guide shoes 24, 26, which are slidably insertable into slot 28 on sliding table 30 of the table saw 32 shown in FIG. 1. When these two pneumatic cylinder pistons 20, 22 are retracted, the apparatus of the present invention is locked onto the sliding table 30 of the table saw 32. The other two pneumatic cylinders 16, 18 in the base unit 10 each have pistons 34, 36 each of which is connected to one of two horizontal clamp pads 38, 40. When these other two pneumatic cylinder pistons 34, 36 are extended, the horizontal clamp pads 38, 40 exert horizontal pressure on the sides of stacked items 39 held by the present apparatus. The horizontal clamp pads 38, 40 are round and relatively large so that pressure exerted will be distributed over a large section of each individual stacked item 39, and thereby avoid damage to the item. Another reason that the horizontal clamp pads 38, 40 are relatively large is to ensure that a substantial thickness of stacked items 39 will be engaged by the horizontal clamp pads 38, 40.

A cross arm 42 as shown in FIGS. 1 and 2 is connected to the base unit 10 and projects horizontally in the same direction as the horizontally projecting pneumatic clamp cylinders 16, 18. Projecting vertically downward from the cross arm 42 are two vertical clamping pneumatic cylinders 44, 46 which each have pistons 48, 50 connected to vertical clamping pads 52, 54. Relative to the base unit 10, the nearer vertical pneumatic clamping cylinder 46 is placed close to the base unit 10, so that the near sides of the stacked items will be adequately secured, even if there is minor unevenness in the stacked items on the side closer to the base unit 10. Also relative to the base unit 10, the farther of the two vertical pneumatic clamping cylinders 44 is adjustable in an elongated slot 56 so that it can be moved nearer or farther from the base unit 10. Consequently, the edge of the stacked items farther away from the base unit is adequately secured despite minor unevenness in the stacked items. Pneumatic pressure is delivered via conduits and quick exhaust valves 45, 47 to the vertical pneumatic cylinders, 44, 46. When the two vertical pneumatic cylinder pistons 48, 50 are extended, the vertical clamp pads 52, 54 exert vertical pressure on the top of the stacked items to be held by the apparatus of the present invention. Adjustment of the quick exhaust valves 45, 47 allows immediate release of the pressure on the stacked items, enabling convenient movement and removal of the present apparatus. The vertical clamp pads 52, 54 are made of a substance such as polypropylene or nylon that will result in minimal scratching of the surface of the material being clamped.

In order to control the pneumatic cylinders 12, 14, 16, 18, 44, 46 in the device, there is a pressure manifold 58 (FIG. 3) in the base unit 10. The pressure manifold 58 receives air from an external air supply (not depicted) connected via a conduit 59 to a socket 60 on a rear portion of a top plate 62 of the base unit 10. A control switch 64 that controls the pressure manifold 58 projects horizontally through a back plate 66 of the base unit 10. Depending on how the control switch 64 is positioned, air may be delivered via pneumatic tubes 68, 70, 72, 74, 76, 78 to any or all of the pneumatic cylinders 12, 14, 16, 18, 44, 46. Delivery of air to the pneumatic cylinders 12, 14, 16, 18, 44, 46 results in extension of associated pneumatic pistons 20, 22, 34, 36, 50 with consequent increased pressure on the clamp pads 38, 40, 52, 54, or increased locking force on the guide shoes 24, 26. Alternately, air may be withdrawn via pneumatic tubes 68, 70, 72, 74, 76, 78 from the pneumatic cylinders 12, 14, 16, 18, 44, 46 by adjusting the control switch 64. Withdrawal of air from the pneumatic cylinders 12, 14, 16, 18, 44, 46 results in retraction of the associated pneumatic pistons 20, 22, 34, 36, 50 with consequent decreased pressure on the clamp pads 38, 40, 52, 54, or reduced locking force on the guide shoes 24, 26.

A pressure regulator 84 in the base unit 10 can be adjusted to vary the pressure applied to the pneumatic clamping cylinders 16, 18. A pressure regulator 86 in the base unit 10 can be adjusted to vary the pressure applied to the pneumatic clamping cylinders 44, 46. There is no pressure regulator for the pneumatic cylinders 12, 14 that control the guide shoes 24, 26.

On a rear portion of a bottom plate 80 of the base unit 10 as shown in FIG. 3, there is a cylindrical handle member 82 that projects upward and allows forward and backward manipulation of the entire device. The bottom plate also 80 has an underlying surface layer or pad 90 comprised of a material selected from the phenolic family of chemical compounds. This pad 90 serves to prevent excessive friction or scraping between the bottom plate 80 and the sliding table 30 of the sliding table saw 32.

It is to be understood that the present invention is not limited to the sole embodiment described above, but encompasses any and all embodiments within the scope of the following claims.

I claim:

1. A clamp device for securing stacked items on a sliding table of a table saw comprising:
   a base unit for securing and orienting components of the device, said base unit comprised by a bottom wall, two side walls, a front wall, and a back wall;
   a plurality of horizontally projecting clamp members mounted to said base unit;
   a cross arm projecting horizontally from said base unit in the same direction as said horizontally projecting clamp members;
   a plurality of vertically projecting clamp members mounted on said cross arm;
   at least one guide shoe for mounting the clamp device to a sliding table of a table saw; and
   a switch for controlling the application of pressure on said horizontally and vertically projecting clamp members and said at least one guide shoe.

2. The clamp device according to claim 1, wherein said horizontally and vertically projecting clamp members include pneumatic cylinders, each having a piston.

3. The clamp device according to claim 1, wherein one of said vertically projecting clamp members is slidably adjustable along said cross arm.

4. The clamp device according to claim 1, wherein said at least one guide shoe is controlled by a pneumatic cylinder.

5. The clamp device according to claim 1, wherein said switch comprises a manifold for controlling the movement of said horizontally and vertically projecting clamp members and said at least one guide shoe.

6. The clamp device according to claim 1, wherein said bottom wall is attached to a supporting pad comprised of a friction reducing material.

7. A clamp device for securing stacked items on a saw table comprising:

a base unit;

at least one horizontally projecting clamp member mounted on said base unit;

a cross arm projecting horizontally from said base unit in the same direction as said horizontally projecting clamp member;

at least one vertically projecting clamp member mounted on said cross arm;

at least one guide shoe for mounting the clamp device to a sliding table of a table saw; and a switch means for controlling the application of pressure on said at least one horizontally projecting clamp member said at least one vertically projecting clamp member and said at least one guide shoe.

8. The clamp device according to claim 7, wherein said at least one horizontally projecting clamp member and said at least one vertically projecting clamp member, each include a pneumatic cylinder.

9. The clamp device according to claim 7, wherein said at least one vertically projecting clamp member is slidably adjustable along said cross arm.

10. The clamp device according to claim 7, wherein said at least one guide shoe is controlled by a pneumatic cylinder.

11. The clamp device according to claim 10, wherein said switch means comprises a manifold through which air is withdrawn from said pneumatic cylinder controlling the movement of said guide shoe.

12. The clamp device according to claim 8, wherein said switch means comprises a manifold through which air is directed to each said pneumatic cylinder for controlling movement of said at least one horizontally projecting clamp member and said at least one vertically projecting clamp member.

13. The clamp device according to claim 7, wherein said base unit includes an underlying pad of friction reducing material.

* * * * *